Dec. 11, 1962 C. B. WATTS, JR 3,068,431

VARIABLE DELAY LINE

Filed Jan. 2, 1959 2 Sheets-Sheet 1

INVENTOR.
Chester B Watts
BY
EZEKIEL WOLF, WOLF & GREENFIELD

Dec. 11, 1962 C. B. WATTS, JR 3,068,431
VARIABLE DELAY LINE
Filed Jan. 2, 1959 2 Sheets-Sheet 2

INVENTOR.
Chester B. Watts
BY
EZEKIEL WOLF, WOLF & GREENFIELD

United States Patent Office 3,068,431
Patented Dec. 11, 1962

3,068,431

VARIABLE DELAY LINE

Chester B. Watts, Jr., Winchester, Mass., assignor to Andrew Alford, Boston, Mass.

Filed Jan. 2, 1959, Ser. No. 784,812
11 Claims. (Cl. 333—31)

The present invention relates to a variable delay line and in particular to a variable delay line adapted to provide a continuously variable and adjustable delay.

It is an object of the present invention to provide a variable delay line adapted for use in a coaxial line system wherein a variable delay may be introduced into the line while still maintaining substantially the same characteristic impedance of the line. It is also an object of this invention to provide a variable delay line in which there is sinusoidal variation of delay and in which a series of successive delay cycles may be introduced into the system.

A preferred form of the invention contemplates a stator and rotor arrangement in which the stator forms a portion of the inner conductor of a coaxial line and provides a series of successive wide and narrow portions having respectively, a capacitance to the casing of the delay line and an inductance. The rotor provides a series of spaced projections adapted to rotate into successive proximity with the wide and narrow portions, thereby introducing simultaneous and substantially proportionate variations in the capacitance and inductance of the delay line. Since the delay of a delay line is determined by the square root of the product, LC, a proportionate increase or decrease of the inductance or capacitance will, of course, vary the delay accordingly. On the other hand, as the ratio $L/C$ determines the characteristic impedance of the line, this ratio remains substantially proportionate and consequently, the impedance of the line will remain substantially the same.

These and other objects and advantages of the present invention will be more clearly understood when considered in conjunction with the accompanying drawing in which.

Figure 1:
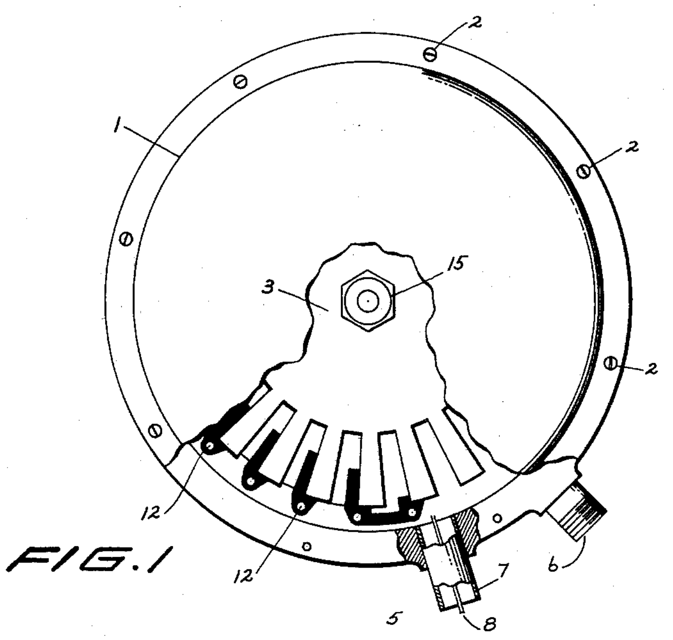
FIGURE 1 is a top plan partially fragmentary view of a preferred form of the invention.
Figure 2A:
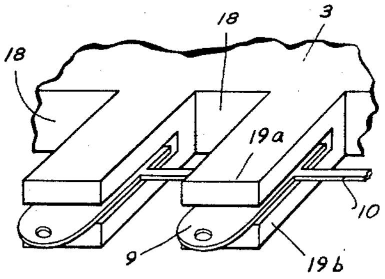
FIGURES 2 and 2A are fragmentary perspectives of a detail of the present invention in different positions of operation.
Figure 2:
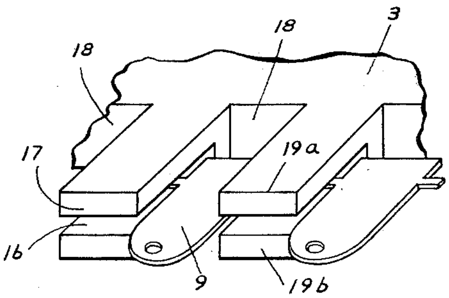
Figure 3:
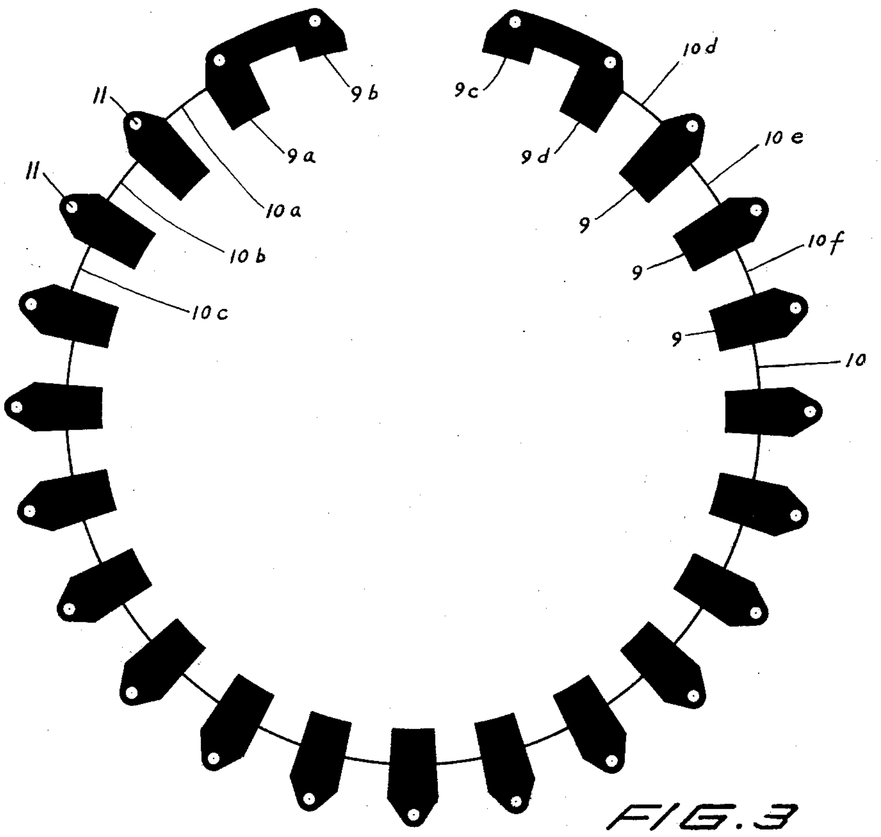
FIGURE 3 is a plan view of the conductive portion of the stator.

Referring first to FIGURES 1, 2 and 3 there is illustrated a delay line having a conductive enclosing casing 1. This casing is provided with opposite side walls continuously joined together at their periphery by suitable means such as screws or bolts 2. This casing which is substantially cylindrical in shape, contains a rotor 3 and stator 4. A pair of coaxial connections 5 and 6 of conventional design are suitably secured to the casing 1, with the outer conductor 7 of the connection 5 and 6 electrically connected to the casing 7. The inner conductor 8 of these connections 5 and 6 is suitably insulated from the casing and is electrically connected with the stator 4. The stator 4 is best shown in FIGURE 3. This stator formed of a series of alternately wide and narrow portions, with the wide portions forming enlargements or tongues, as illustrated at 9. These tongues are interconnected by an arcuate line of uniform width, as indicated at 10. Except for tongues *9a*, *b*, *c* and *d*, the tongues are identical in shape and radial distance from the axis of the delay line. The outer end or portion of each of these tongues is tapered with the hole formed therethrough as indicated at 11. Through each hole there extends a dielectric post 12 (see FIGURE 1) which is suitably secured at its end to the casing 1. These posts rigidly secure the stator 4 in a plane normal to the axis of the delay line and in a position insulated from the casing. The post may be made of nylon or other suitable materials and may be provided with a shoulder section at the opening 11. As illustrated, tongues *9a*, *b*, *c* and *d* are shorter in length, with a heavy secton interconnecting tongues *9a* and *9b* and *9c* and *9d*. The line 10 except for sections *10a*, *10b*, *10c*, *10d*, *10e* and *10f* are the same radial distance from the axis of the delay line. Sections *10a* to *10f* are at different lengths from the axis. These different lengths as well as the shorter lengths of the tongues 9 provide a smoother impedance transition into and out of this line. As illustrated in FIGURE 1, the ends of the line at tongues *9b* and *9c* are connected respectively to the inner conductors 8 of the connections 5 and 6. This stator, which as indicated serves as an inner conductor may be made by any suitable means. In smaller sized devices, it is preferably made by a photoetching process with the stator having a thickness of .047 inch in one specific application which has been built.

The rotor 3 which is illustrated for example in FIGURE 2 is supported on a shaft 15 coaxial with the axis of the delay line casing and has surfaces spaced quite closely to the inner surfaces of the casing 1, thereby providing a rotor having substantially the same potential as and capacitively coupled to the casing 1. Thus, the rotor may be considered to act as the outer conductor of the line. The rotor is formed with an annular groove 16 extending inwardly from the outer edge 17 of the rotor. There is also formed a series of radial slots 18 also extending inwardly from the outer outer edge 17 of the rotor. The groove 16 and slots thereby form a plurality of parallel pairs of projections *19a* and *19b*. The tongues 9 are positioned to lie in a plane coincident with the plane of the groove 16 so that the tongues 9 are effectively sandwiched between the planes of the projections *19a* and *19b*.

Figure 4:
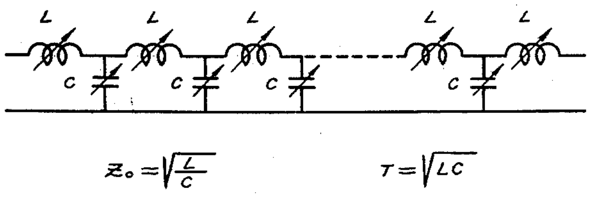
FIGURE 4 is a schematic diagram of the delay line.

Upon rotating the rotor 3, the projections *19a* and *19b* move into successive proximity with successive tongues and intermediate portions as illustrated by a comparison of FIGURES 2 and *2a*. The results of this rotation in effecting a variable delay action may best be understood by referring to FIGURE 4. With the condition of the delay line such as illustrated in FIGURE *2a*, the projections *19a* and *19b* are in close proximity with the tongues 9. In this case, the tongues and projections form a shunt capacitance C to ground, or actually to the casing, while the narrow intermediate portions or line 10 which form a thin wire section are effectively series connections of inductances L. Preferably the ratio $L/C$ is chosen to make the characteristic impedance approximately 50 ohms. The square root of the product LC gives the delay per section through the line. If the rotor moves into the position as illustrated in FIGURE 2, there is a decrease in the shunt capacitance C, since the projections *19a* and *19b* are no longer in close proximity to the tongues. Simultaneously, the projections *19a* and *19b* are now in close proximity to the narrow line portions of the stator. This cuts off some of the surrounding magnetic flux and thereby decreases series induction L. This simultaneous reduction of L and C in about the same proportions tends to keep the ratio $L/C$. Therefore, the characteristic impedance remains substantially constant. While the characteristic impedance remains constant, the product of LC is reduced, thereby giving a smaller value of delay per section through the line. Conversely when the rotor moves from the position shown in FIGURE 2 to a position shown in FIGURE 2*a*, there is an increase in delay while still maintaining the same, or substantially the same characteristic impedance.

While the rotor has twenty-four teeth, there is an inactive section of about 30° between the terminals and the line so that the delay line actually has only about twenty-two sections. Of these twenty-two sections, several at each end are tapered in length to improve the terminal impedance characteristic. It is evident with twenty-four teeth, the delay line goes through twenty-four cycles of delay variation in one revolution of the rotor. Therefore, when using it in various systems, a proper gearing arrangement should be contemplated to account for the number of cycles of delay on each revolution of the rotor.

Figure 5:
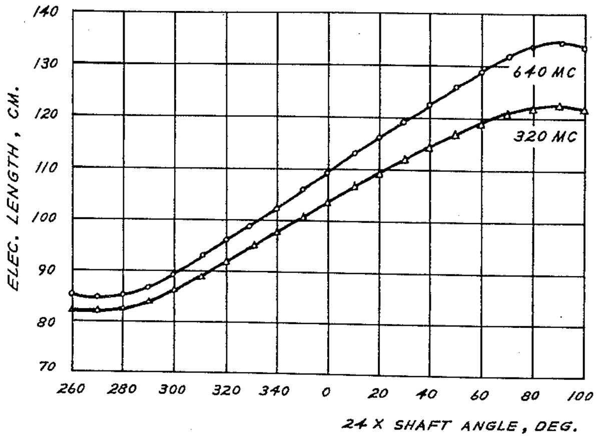
FIGURE 5 is a graph illustrating the effectiveness variation of a delay line with shaft rotation.

In FIGURE 5, there is shown the variations of the effective lengths of delay line with shaft rotation.

Having now described my invention, I claim:

1. A variable delay line comprising a conductive casing having coaxial input and output connections, a conductive line insulatedly separated from said casing, the latter line being connected between the inner conductors of said connections and having successive spaced enlargements with said enlargements having a capacitive coupling to said casing and with the portions of the line intermediate said enlargements having an inductance, a conductive member insulatedly separated from said casing and said conductive line and having a plurality of projections, means supporting said member for movement of said projections into successive proximity with said enlargements and intermediate portions for simultaneous and substantially proportionate variation of said capacitance and inductance.

2. A variable delay line comprising a conductive casing, a stator and a rotor insulatedly separated from each other and said casing, said stator having a conductive line with alternate wide and narrow portions with said portions having respectively a capacitive coupling to said casing and an inductance, said rotor having a plurality of spaced projections, means supporting said rotor for movement of said projections into successive proximity with said wide and narrow portions for simultaneous and substantially proportionate variation of said capacitance and inductance.

3. A variable delay line comprising a conductive casing, a stator and a rotor insulatedly separated from each other and said casing, said stator having a series of successive radially arranged conductive tongues having a capacitive coupling of said casing interconnected by a conductive arcuate line having an inductance, said rotor having a plurality of spaced projections, means supporting said rotor for rotary movement of said projections to and from adjacent relationship with said tongues whereby said capacitance and inductance may be varied proportionately and simultaneously.

4. A variable delay line comprising a conductive casing, a stator and a rotor insulatedly separated from each other and said casing, said stator having a series of successive radially arranged conductive tongues having a capacitive coupling to said casing interconnected by a conductive arcuate line having an inductance, said rotor having an annular groove in its outer edge and a plurality of radially arranged slots extending inwardly from said edge thereby forming a plurality of radially arranged pairs of projections, said tongues positioned within said groove, means supporting said rotor for rotary movement of said projections to and from adjacent relationship with said tongues whereby said capacitance and inductance may be varied proportionately and simultaneously.

5. A variable delay line comprising an outer conductive casing a pair of coaxial connections with the outer conductors of said connections electrically connected to said casing, a stator insulatedly esparated from and within said casing having a series of successive radially arranged conductive tongues having a capacitive coupling to said casing, said tongues interconnected by an arcuate line of narrow width having an inductance, said rotor insulately separated from said stator and said casing, said rotor having an annular groove in its outer edge and a plurality of radially arranged slots extending inwardly from said edge thereby forming a plurality of radially arranged pairs of projections, said tongues positioned within said groove means supporting said rotor for rotary movement of said projections to and from adjacent relationship with said tongues whereby said capacitance and industance may be varied proportionately and simultaneously.

6. A device as set forth in claim 5 having dielectric means radially outward from said rotor supporting the outer portion of each tongue in a plane parallel with the planes of said projections.

7. A device as set forth in claim 6 wherein said dielectric means comprise a post for each tongue and wherein each tongue is formed with an opening through its outer portion through which openings said posts project.

8. A device as set forth in claim 5 wherein the ends of said line are connected between the inner conductors of said connections.

9. A device as set forth in claim 8 wherein said rotor has a high capacitive coupling to said casing.

10. A variable delay line comprising, a generally cylindrical conductive casing having generally parallel top and bottom surfaces generally orthogonal to and spaced along the axis of said casing, input and output coaxial terminal pairs supported within said casing with the outer terminal of each pair connected to said casing, a stator intercoupling the inner terminals of said pairs and comprising alternating tongues each functioning as a capacitor plate of a shunt capacitance and conducting links each functioning as a series inductance in a transmission line intercoupling said coaxial terminal pairs, means for insulatedly supporting said stator within said casing substantially midway between and generally parallel to said top and bottom surfaces with said alternating tongues and links defining an arc around said axis, a disc-like rotor, means for supporting said rotor within said casing for rotation about said axis, said rotor formed with circumferentially displaced projections along its circumferential edge each functioning both as the other capacitor plate of a respective one of said shunt capacitances and for changing the inductance of respective ones of said conducting links upon rotation of said rotor.

11. A variable delay line in accordance with claim 10 wherein each of said projections comprises a pair of opposed surfaces each overlapping said arc on opposite sides of said stator and insulatedly separated from said stator.

References Cited in the file of this patent

UNITED STATES PATENTS

| | | |
|---|---|---|
| 2,411,555 | Rogers | Nov. 26, 1946 |
| 2,527,608 | Willoughby | Oct. 31, 1950 |
| 2,593,361 | Sziklai | Apr. 15, 1952 |
| 2,758,285 | Le Vine | Aug. 7, 1956 |
| 2,892,163 | Todd | June 23, 1959 |
| 2,909,736 | Sommers et al. | Oct. 20, 1959 |
| 2,919,418 | Reis et al. | Dec. 29, 1959 |
| 2,935,705 | Reis | May 3, 1960 |
| 2,943,276 | Lovick | June 28, 1960 |
| 2,968,808 | Russell | Jan. 17, 1961 |